(12) United States Patent
Kapadia et al.

(10) Patent No.: US 8,452,861 B2
(45) Date of Patent: May 28, 2013

(54) BROADCAST DESIGN FOR PROVISIONING RECONFIGURABLE OPTICAL ADD/DROP MULTIPLEXER CIRCUITS

(75) Inventors: Lakshmi Prasanna Kapadia, Wesley Chapel, FL (US); David Lopez, Tampa, FL (US); Hrushikesh Dingari, Tampa, FL (US); Manish Kharod, Tampa, FL (US); Sengodan Subramanian, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 748 days.

(21) Appl. No.: 12/145,634

(22) Filed: Jun. 25, 2008

(65) Prior Publication Data
US 2009/0327901 A1  Dec. 31, 2009

(51) Int. Cl.
*G06F 15/173* (2006.01)
(52) U.S. Cl.
USPC .......................................... 709/223; 370/254
(58) Field of Classification Search
USPC .. 709/229, 225, 224, 223, 221, 220; 370/469, 370/412, 406, 401, 392, 352; 398/32, 3; 715/700, 733, 738, 748
See application file for complete search history.

(56) References Cited

U.S. PATENT DOCUMENTS

| | | | | |
|---|---|---|---|---|
| 6,272,154 | B1 * | 8/2001 | Bala et al. | 370/535 |
| 2001/0027484 | A1 * | 10/2001 | Nishi | 709/223 |
| 2002/0024535 | A1 * | 2/2002 | Ueno et al. | 345/736 |
| 2003/0152072 | A1 * | 8/2003 | Guild et al. | 370/386 |
| 2007/0147268 | A1 * | 6/2007 | Kelley et al. | 370/254 |
| 2007/0147269 | A1 * | 6/2007 | Ettle et al. | 370/254 |

* cited by examiner

*Primary Examiner* — Emmanuel L Moise
*Assistant Examiner* — Charles Murphy

(57) ABSTRACT

A method includes receiving an order for services to be provided by an optical network, the order identifying bandwidth requirements for the optical network and multiple broadcast locations; creating an optical network identifier, the optical network identifier including an aggregation of dense wavelength data multiplexers that may define one or more paths; prompting a user to select a path for a broadcast circuit through the dense wavelength data multiplexers using a graphical user interface; querying an operations support service for available bandwidth to support bandwidth requirements over the selected path; and assigning the circuit path based on the available bandwidth.

20 Claims, 11 Drawing Sheets

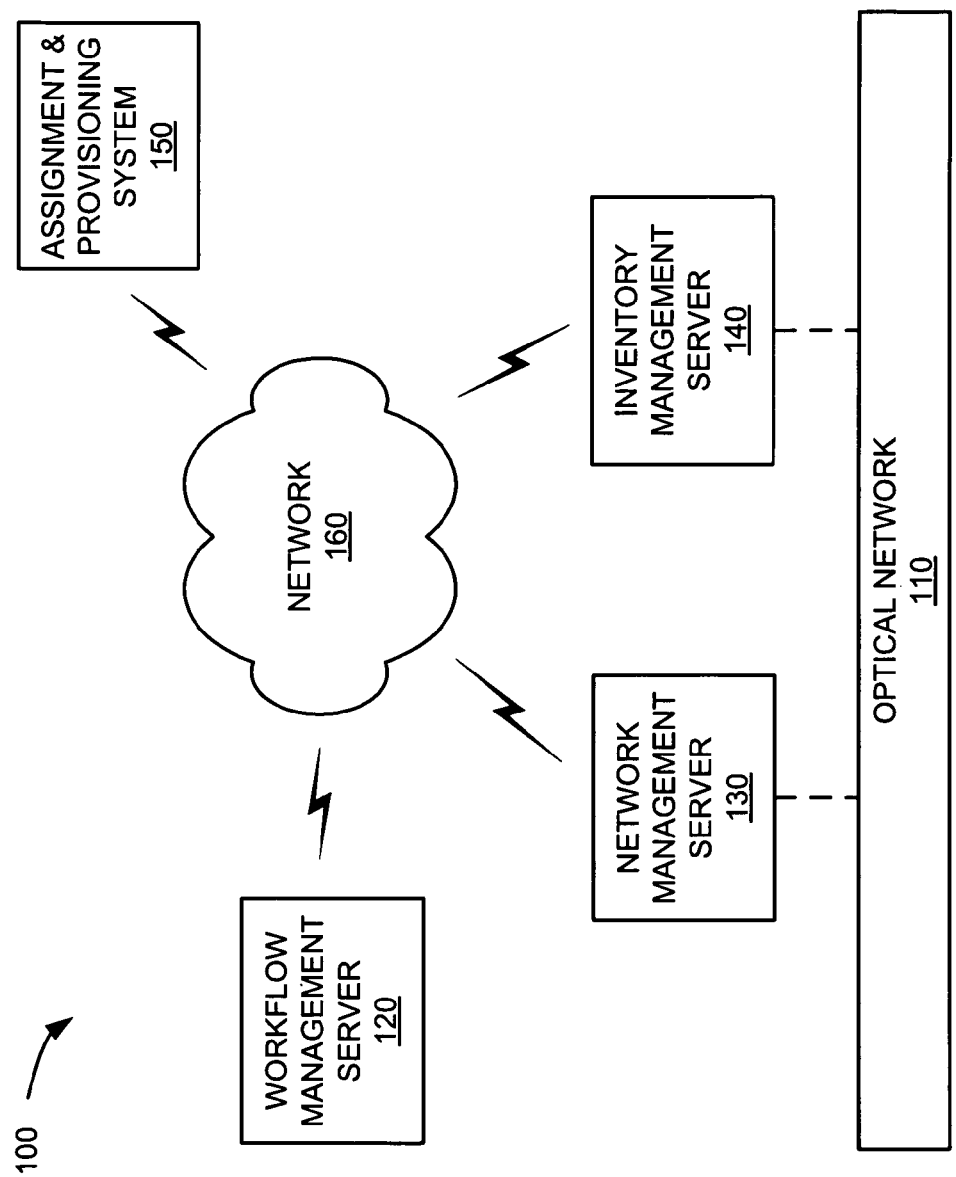

BROADCAST DESIGN FOR PROVISIONING RECONFIGURABLE OPTICAL ADD/DROP MULTIPLEXER CIRCUITS

BACKGROUND INFORMATION

A dense wavelength division multiplexing (DWDM) optical transport platform (OTP), also generically recognized as reconfigurable optical add/drop multiplexer (ROADM) technology, is becoming more widely used as network providers seek to increase network capacities. The technology provides wavelength provisioning for cost-effective transport of high-bandwidth services with DWDM.

BRIEF DESCRIPTION OF THE DRAWINGS

FIG. 1A depicts an exemplary system in which systems and methods described herein may be implemented;

DETAILED DESCRIPTION OF PREFERRED EMBODIMENTS

Figure 1B:
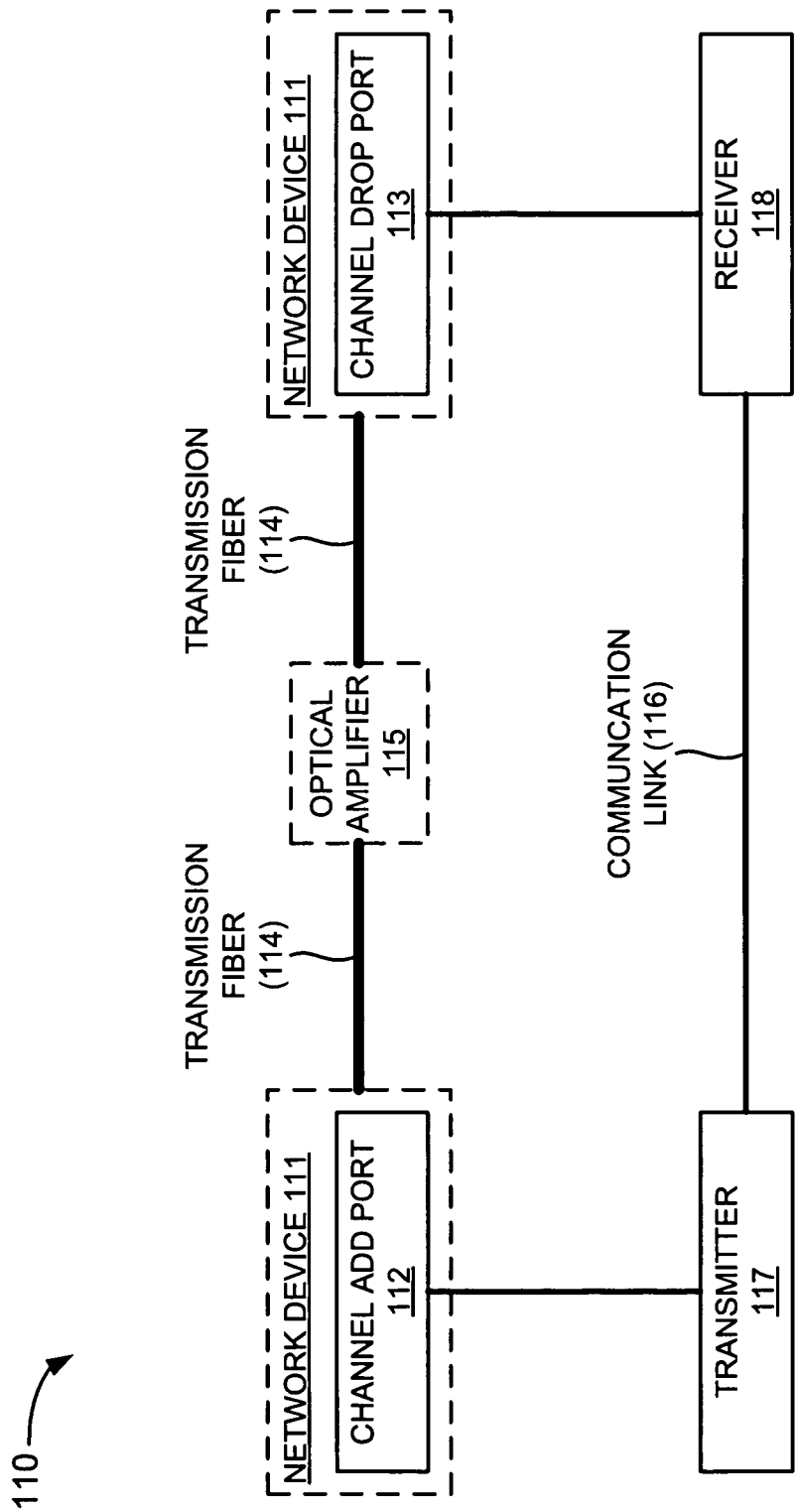
FIG. 1B depicts an exemplary optical network for which systems and methods described herein may be implemented.

The following detailed description refers to the accompanying drawings. The same reference numbers in different drawings may identify the same or similar elements. Also, the following detailed description does not limit the invention.

Implementations described herein may provide ways of building a facility circuit on a particular wavelength using the wavelength selective switching (WSS) feature of Reconfigurable Optical Add/Drop Multiplexer (ROADM) devices. A user may provide inputs via a graphical user interface (GUI) and then may provision the facility circuit, such as a high-capacity optical carrier circuit (e.g., OC-192), that can broadcast at multiple locations (e.g., drop and continue). Upon completion of the design, the facility circuit may be presented in the GUI and also as a circuit layout record (CLR).

FIG. 1A depicts an exemplary system 100 in which systems and methods described herein may be implemented. System 100 may include multiple components to provide information and provision a broadcast circuit in optical network 110. The system may include workflow management server 120, network management server 130, inventory management server 140, and assignment and provisioning system 150 interconnected by a network 160. Workflow management server 120, network management server 130, inventory management server 140, and assignment and provisioning system 150 may connect to network 110 via wired and/or wireless connections. One workflow management server, network management server, inventory management server, assignment and provisioning server, and two networks have been illustrated in FIG. 1 for simplicity. In practice, there may be more or fewer servers and/or networks. Also, in some instances, one or more of workflow management server 120, network management server 130, inventory management server 140, and assignment and provisioning system 150 may perform one or more functions described as being performed by another one or more of workflow management server 120, network management server 130, inventory management server 140, and assignment and provisioning system 150.

Returning to FIG. 1A, in one implementation, workflow management server 120, network management server 130, and inventory management server 140 may be part of legacy systems to support infrastructure of optical network 110. Workflow management server 120 may be integrated with a workflow management system that may coordinate use of equipment and human resources. Workflow management server 120 may provide access to information, for example, staffing availability records, man-hour provisioning, task scheduling, work order management and other information that may be tracked by the workflow management system.

Network management server 130 may be integrated with a network management system or another operations support system (OSS) that allows remote management of network assets across a network infrastructure, such as optical network 110. In some implementations, data from multiple vendors, protocols, and legacy systems may be collected from various probes and other inputs into a single network management portal managed by server 130. Network management server 130 may provide a real-time view of physical and logical assets in, for example, optical network 110. The status and availability of optical network 110 assets may be stored, for example, in a database that may be accessed by network management server 130.

Inventory management server 140 may be integrated with an OSS that provides inventory record maintenance, selection and assignment of components from inventory, and/or preparation and distribution of circuit work orders. In one implementation, inventory management server 140 may access the Trunks Integrated Record Keeping System (TIRKS). TIRKS is mainframe-based computer system that provides records keeping for interoffice trunk facilities.

Assignment and provisioning system 150 may communicate with each of workflow management server 120, network management server 130, and inventory management server 140, and assignment and provisioning system 150 to collect and assemble necessary information to allow a user to create a facility circuit design in response to, for example, a new customer work order. Assignment and provisioning system 150 may include a GUI that allows a user to input required information in a step-by-step logical process. As described in more detail below, the GUI provides a single interface to design a facility circuit, initiate implementation activity, and track progress toward completion.

Network 160 may include a local area network (LAN), a wide area network (WAN), a metropolitan area network (MAN), an intranet, the Internet, or a combination of networks.

FIG. 1B provides an exemplary diagram of optical network 110 of FIG. 1A. As illustrated, network 110 may include a network device 111 (e.g., that includes a channel add port 112) and another network device 111 (e.g., that includes a channel drop port 113), interconnected via transmission fibers 114 and an optical amplifier 115. Network 110 may further include a communication link 116 between a transmitter 117 connected to channel add port 112 and a receiver 118 connected to channel drop port 113. Two network devices, two transmission fibers, a single optical amplifier, a single transmitter, and a single receiver have been illustrated in FIG. 1B for simplicity. In practice, there may be different, more, or less network devices, transmission fibers, optical amplifiers, transmitters, and/or receivers. Also, in some instances, one of network devices 111 may perform one or more functions described as being performed by another one of network devices 111. In one implementation, network devices 111, transmission fibers 114, and optical amplifier 115 may form a DWDM-based network, a high bit rate-based network, etc. In other implementations, network devices 111, transmission fibers 114, and optical amplifier 115 may form other types of optical-based networks.

Each of network devices 111 may include a data transfer device, such as an optical add-drop multiplexer (OADM), a gateway, a router, a switch, a firewall, a network interface card (NIC), a hub, a bridge, a proxy server, or some other type of device that processes and/or transfers data. In one example, each of network devices 111 may be capable of establishing a channel that optically communicates information between channel add port 112 and channel drop port 113.

Channel add port 112 may include a port that enables network device 111 to add one or more wavelength channels to an existing optical signal (e.g., an existing multi-wavelength wavelength division multiplexing (WDM) signal), and to transmit optical signals to transmission fiber 114. In one implementation, network device 111 with channel add port 112 may be part of a video hub office (VHO) that may include broadcast systems and content for distribution, such as video-on-demand (VOD), interactive applications (e.g., impulse pay-per-view (IPPV)), and interactive program guides (IPG), and regional content. The VHO may also include servers and mass storage devices (not shown).

Channel drop port 113 may include a port that enables network device 111 to de-multiplex optical signals on a channel, and/or to provide the de-multiplexed optical signals to receiver 118. In one implementation, network device 111 with channel drop port 113 may be part of a video serving office (VSO) that may receive signals from the VHO. The VSO may assemble the signals with other signals for final transport to particular subscriber premises.

Each of transmission fibers 114 may include a connection, a coupling, a link, or another similar mechanism by which optical signals, which may be carried by one optical component, may be imparted to a communicating optical component. For example, transmission fibers 114 may permit network devices 111 to optically communicate with each other, and may permit optical signals to be transmitted between network devices 111. "Optically communicating" devices may not necessarily be directly connected to one another and may be separated by intermediate optical components or devices.

Optical amplifier 115 may include a device that amplifies an optical signal directly, without converting the optical signal into an electrical signal. In one example, optical amplifier 115 may include a gain medium that causes amplification of an incoming optical signal.

Communication link 116 may include a connection, a coupling, a link, or other similar mechanism by which transmitter 117 may communicate with receiver 118.

Transmitter 117 may include a device capable of generating optical pulses with two frequencies within a channel of an optical fiber based system (e.g., transmission fiber 114), via channel add port 112. Receiver 118 may include a device capable of separating and measuring arrival times of the two optical pulses. Although transmitter 117 and receiver 118 are shown as being separate devices, in other implementations, transmitter 117 and receiver 118 may be combined within a single device or included within other network devices.

Although FIG. 1B shows exemplary components of network 110, in other implementations, network 110 may contain fewer, different, or additional components than depicted in FIG. 1B.

Figure 2:
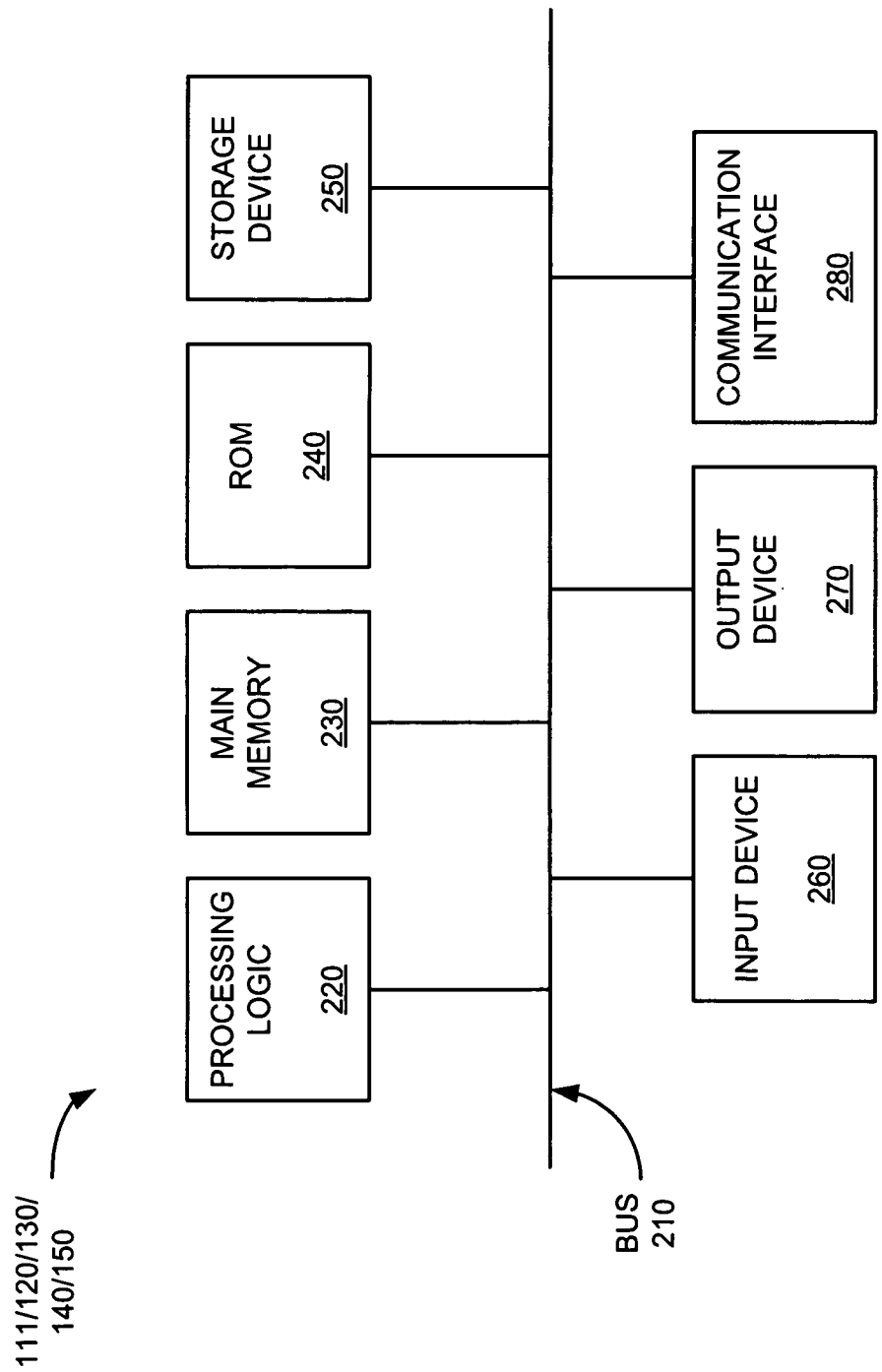
FIG. 2 is a diagram of an exemplary device that may be used in the system and networks of FIGS. 1A and 1B.

FIG. 2 is an exemplary diagram of a device 200 that may correspond to network devices 111, workflow management server 120, network management server 130, inventory management server 140, and/or assignment and provisioning system 150. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 100.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
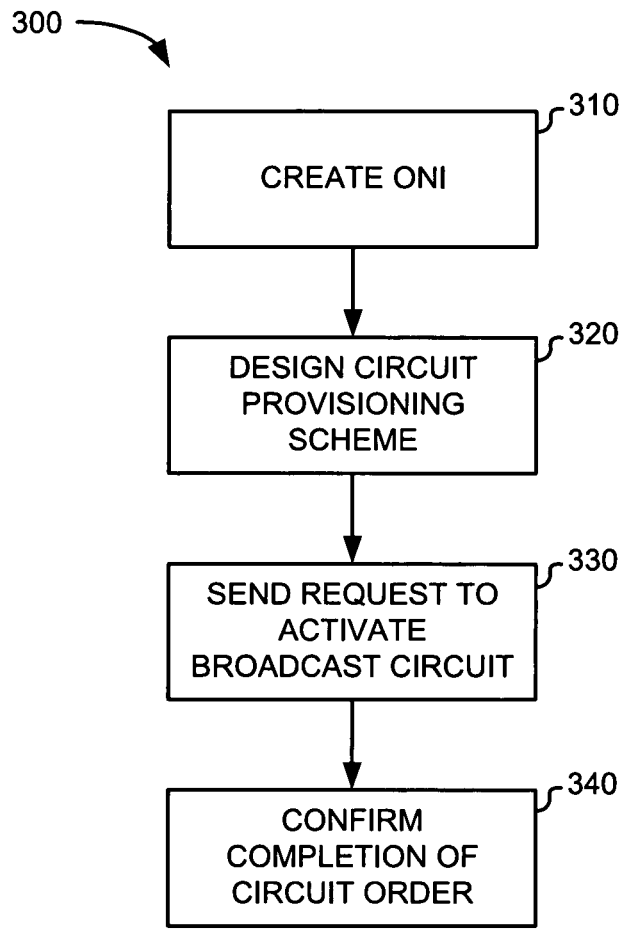
FIG. 3 is a flow chart illustrating exemplary operations for provisioning a broadcast facility circuit for a DWDM-based network.

The methods and systems disclosed herein enable a user to design and provision a broadcast circuit using a single GUI in an assignment and provisioning system to facilitate orders and feedback from other facilities and service providers for the network. An order for services through an optical network may be received either from an internal agent or from an external entity. In either case, the order may include bandwidth requirements for the optical network and multiple broadcast locations FIG. 3 provides a flow chart illustrating exemplary operations for provisioning a broadcast facility circuit for a DWDM-based network using an assignment and provisioning system. An optical network identifier (ONI) is created (block 310). The ONI may be an aggregation of underlying DWDMs that may define, for example, the light path for a network to be used in provisioning a facility circuit. The ONI may be graphically displayed on a GUI, such as a GUI provided by assignment and provisioning system 150. Additional details for creating an ONI are provided in FIG. 4.

Still referring to FIG. 3, a circuit provisioning scheme may be designed (block 320). In implementations described herein, the circuit provisioning scheme may be conducted by a user on a single GUI. Additional details for designing a circuit provisioning scheme are provided in FIG. 5. Based on the provisioning scheme, work orders may be completed to, for example, complete the physical structure of the broadcast circuit. The completion of the work orders may, for example, trigger assignment and provisioning system 150 that activation of the broadcast circuit can be requested.

A request to activate the broadcast circuit may be sent (block 330). For example, assignment and provisioning system 150 may send an activation request to an element management system, such as network management server 130, to activate cross-connects within the broadcast circuit and any plug-in options.

The completion of the circuit order may be confirmed (block 340). For example, assignment and provisioning system 150 may receive an order completion status from the workflow management server 120. The order completion status may be used to complete the record for the assignment and provisioning system 150.

Figure 4:
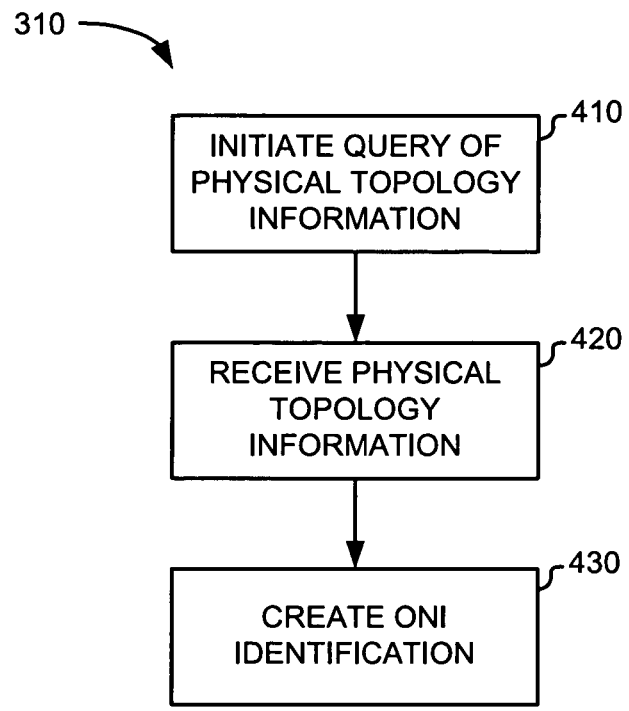
FIG. 4 is a flow chart illustrating exemplary operations for creating an optical network identifier.

FIG. 4 provides a flow chart illustrating exemplary operations for creating an optical network identifier. A query of the physical topology information maybe initiated (block 410). For example, a user may initiate a query of the DWDM topology for a particular geographical region. The request may include, for example, a query regarding optical transport system components such as long reach amplifier modules, line interface output amplifier modules, line interface reconfigurability class marketing modules (RCMM). The query may be submitted to an operations support system (OSS), such as inventory management server 140 or other various legacy systems, field offices, or services that provides inventory and order control management. The physical topology information may be received (block 420). For example, inventory management server 140 may provide, for example, to the GUI provided by assignment and provisioning system 150, computer information regarding the optical transport system components in the specified geographical region. An ONI identification may then be created (block 430). For example, assignment and provisioning system 150 may assemble the topology information into an ONI using a protocol determined by the user. Such protocol may include, for example, a graphical layout of the nodes and connections for the specified geographical region with detailed information about each node equipment provided within the graphical representation of each node.

Figure 5:
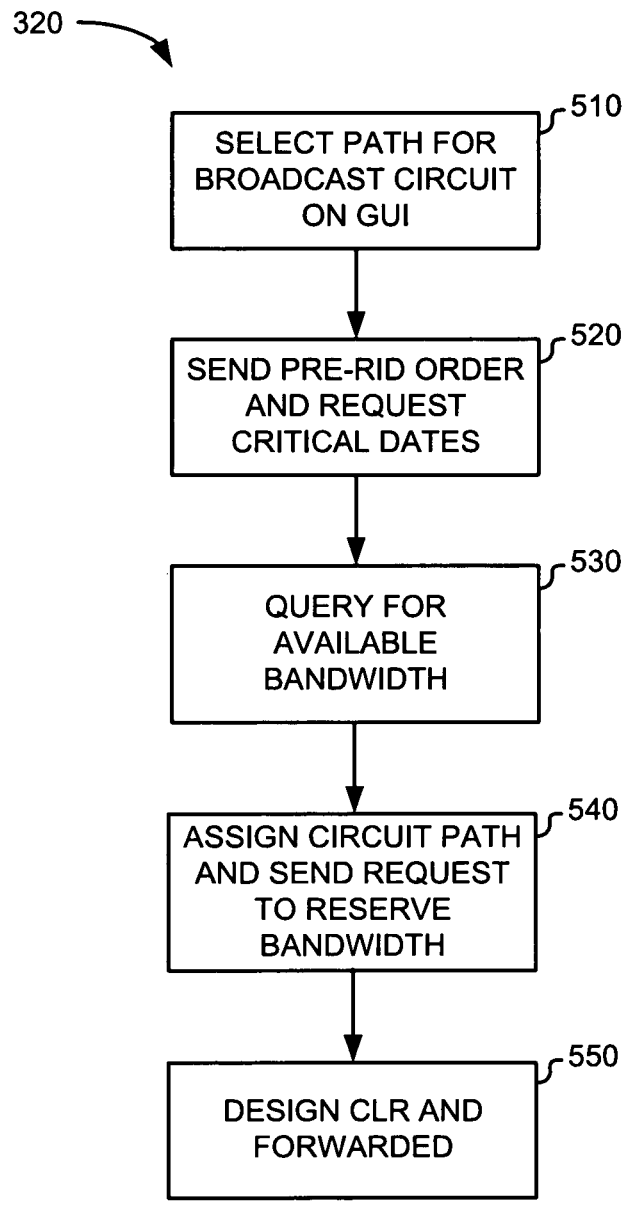
FIG. 5 is a flow chart illustrating exemplary operations for designing a circuit provisioning scheme.

FIG. 5 provides a flow chart illustrating exemplary operations for block 320, designing a circuit provisioning scheme. A path for the broadcast circuit may be selected using a GUI (block 510). For example, a user may provide inputs via the GUI provided by assignment and provisioning system 150. The GUI may provide a user-friendly and interactive tool that walks the user through the path selection process in a logical sequence. In one implementation, the path may identify multiple nodes for a circuit path. Additional details for selecting a path for the broadcast circuit are provided in FIG. 6.

Continuing with FIG. 5, a pre-record-issue-date (pre-RID) order may be sent and critical dates requested (block 520). For example, the user (using the GUI) may send a request for information on service deadlines or critical dates that may need to be met to support operation of the network. The request may be submitted, for example, to workflow management server 120 or another service that provides workflow management data. In another implementation, a request for information on service deadlines may be sent automatically by assignment and provisioning system 150.

A query for available bandwidth may be sent (block 530). For example, the assignment and provisioning system 150 may send a request for spare channels, paired cards, or paired slots for any VHO(s) and VSO(s) in the broadcast circuit. The query may be submitted to an OSS, such as inventory management server 140, or other service that provides inventory and order control management of circuits within the network. An accounting of available bandwidth may be provided back to assignment and provisioning system 150.

A circuit path may be assigned and a request sent to reserve bandwidth (block 540). For example, upon confirmation of available bandwidth, assignment and provisioning system 150 may select available bandwidth resources to support the selected path for the broadcast circuit. Assignment and provisioning system 150 may send a request to reserve the bandwidth to the OSS that provided the accounting of available bandwidth in block 530 (e.g., inventory management server 140). The OSS may reserve for bandwidth for the circuit path according to the designated purpose of the path. For example, bandwidth may be requested for broadcast video and reserved as "video" by the OSS.

A CLR may be designed and forwarded (block 550). Generally, a CLR may include design parameters for the provisioned circuit. The circuit design may be communicated to a field office for implementation. The assignment and provisioning system 150 may, for example, use the information for the circuit path provided in block 510, the critical dates provided in block 520, the bandwidth information provided in block 530 to automatically compile a CLR. The CLR may be forwarded to, for example, a field office, an operations support system (OSS), or another entity that provides workflow management services. In one implementation, the CLR may be forwarded to the same entity that provides critical dates in response to the request in block 520 (e.g., workflow management server 120). The CLR may be used by the OSS (e.g., inventory management server 140) and field offices to create and assign work orders to physically establish the broadcast circuit. The work orders may be competed by other personnel and network systems.

Figure 6:
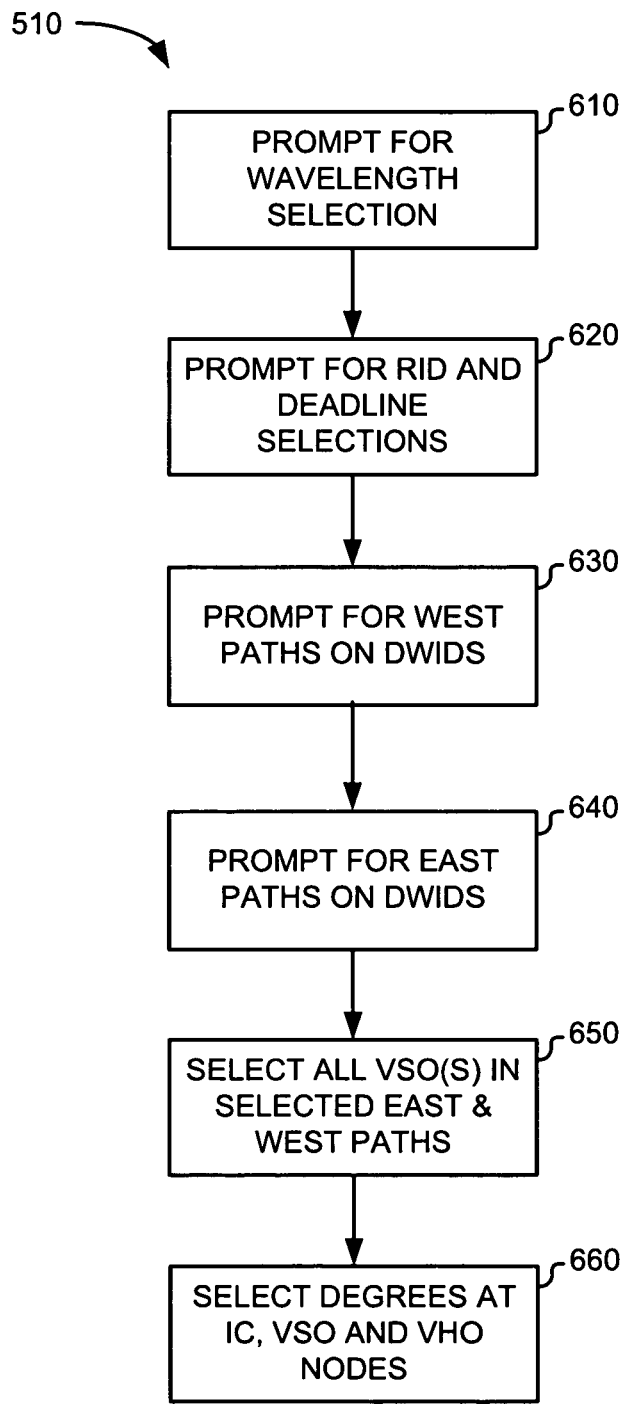
FIG. 6 is a flow chart illustrating exemplary operations for selecting a path for the broadcast facility circuit.

FIG. 6 provides a flow chart illustrating exemplary operations for block 510, selecting a path for the broadcast circuit. The user may be prompted for a wavelength selection (block 610). For example, the GUI provided by assignment and provisioning system 150 may provide the user with a list of optical wavelength intervals to select from for the prospective circuit. A variety of factors may influence a user's wavelength selection, including for example, the designated use restrictions for particular wavelengths by the network provider and/or consistency with other uses within the network.

The user may be prompted for record issue dates and/or other service deadlines (block 620). For example, the GUI of assignment and provisioning system 150 may provide the user with a date- and/or time-formatted entry to indicate when the broadcast circuit is to be operational. The deadline may be driven, for example, by a standard response-time (e.g., 7 business days) or expedited response-time (e.g., 3 business days) for customer orders. In such cases, the user may select from options, such as "standard" or "expedited," from which the system may calculate the deadline.

Figure 7A:
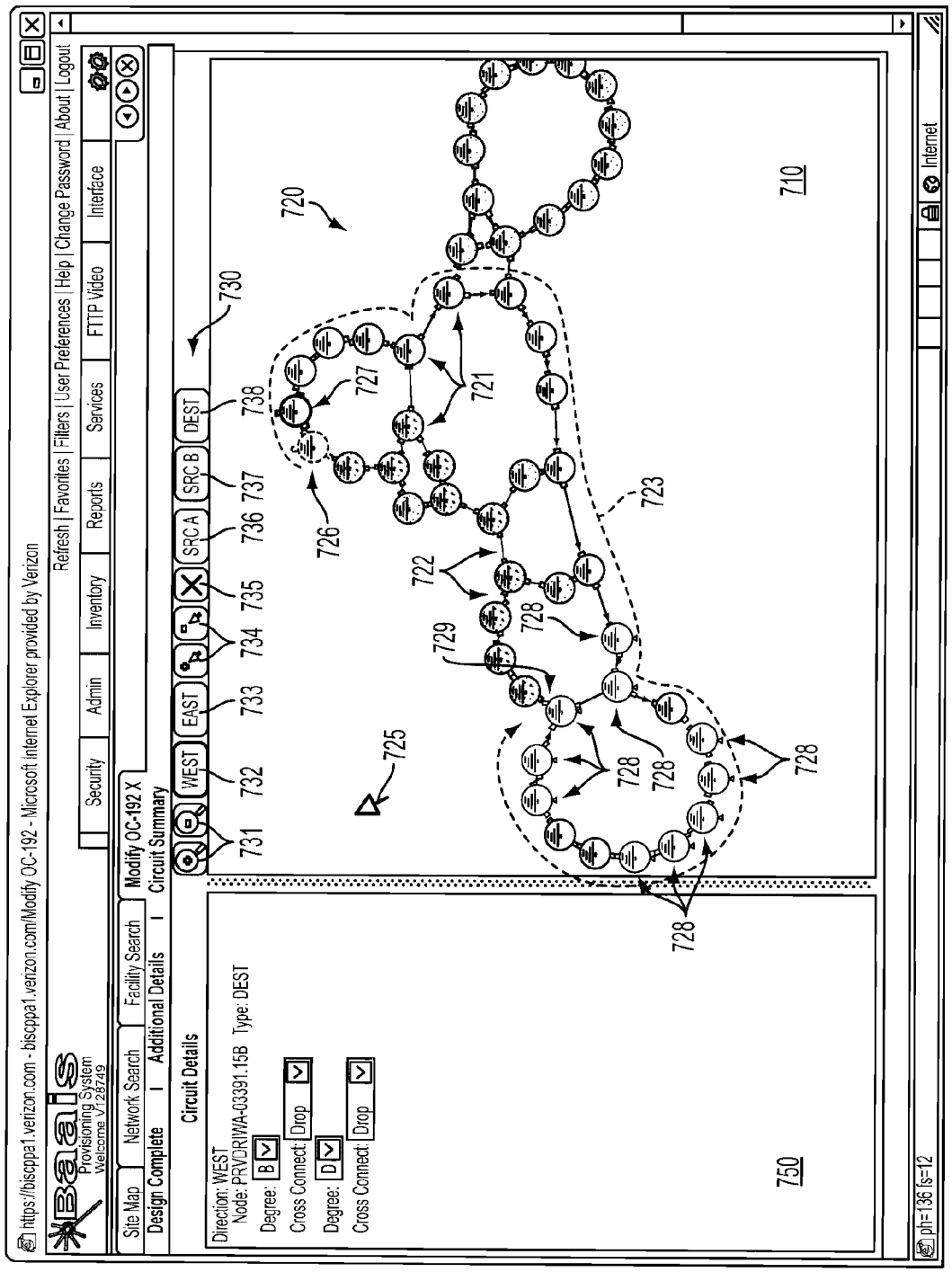
FIGS. 7A-B provide screen shots of an exemplary GUI for selecting paths for dense wavelength division multiplexing IDs (DWIDs) within an optical network identifier (ONI)
Figure 7B:
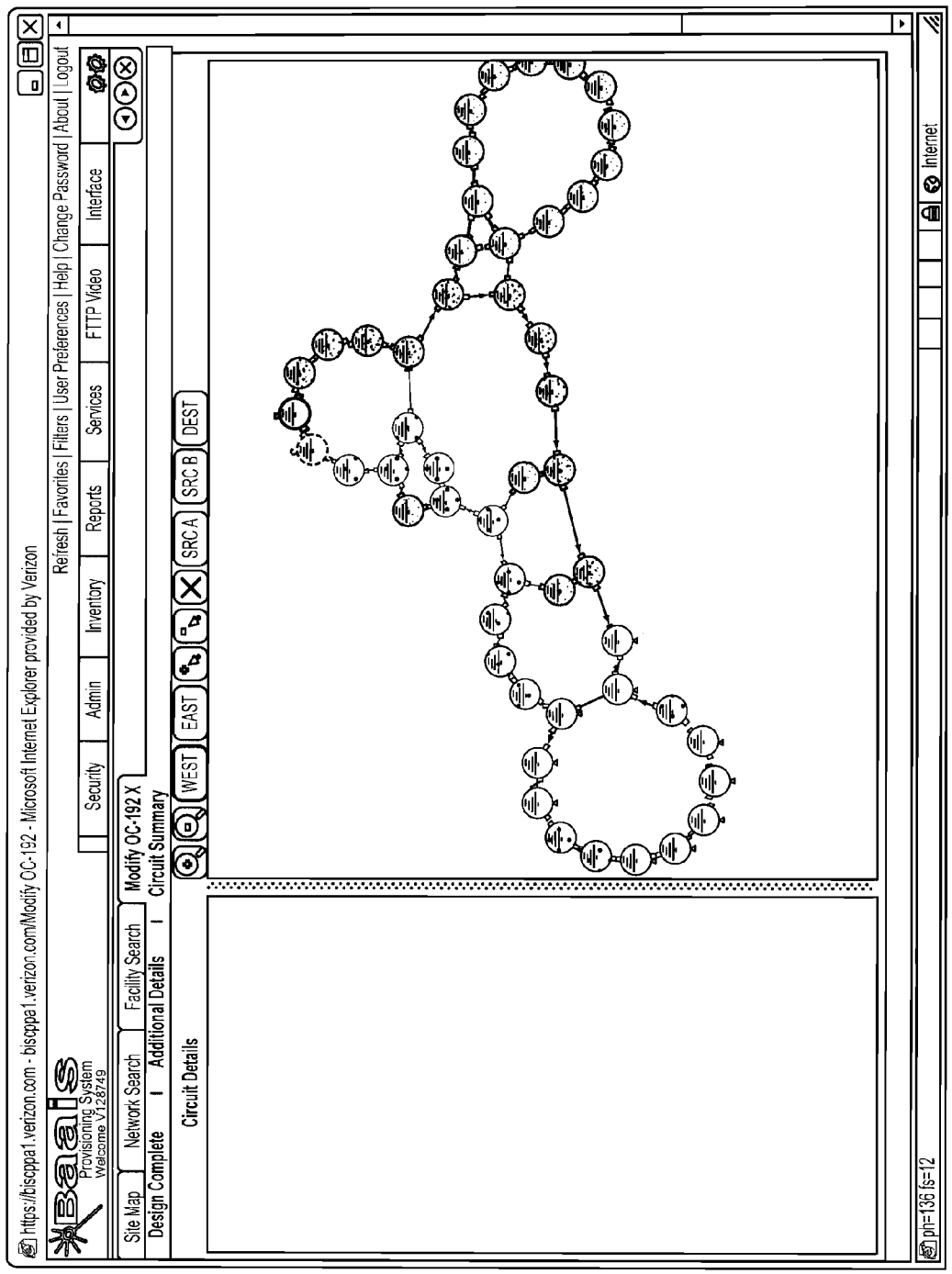

The user may be prompted for west paths on dense wavelength division multiplexer identifiers (DWIDs) (block 630). For example, the GUI provided by assignment and provisioning system 150 may allow the user to select separate west paths for all destination nodes from a source node. For each DWID, the user may select a west path from a source node to a destination node, with the source node in the first DWID being, for example, a VHO. FIGS. 7A and 7B provide screen shots of an exemplary GUI for selecting paths for several DWIDs within an ONI. In FIG. 7A, a west path is shown. In FIG. 7B, an east path is shown.

As shown in FIG. 7A, the graphical user interface may include a first area 710, and a second area 750. First area 710 may provide a graphical layout 720 of one or more portions of an ONI. The graphical layout may visually present node indicators (such as representative node indicators 721) and connecting paths (such as representative connecting paths 722) within the ONI. The graphical layout 720 may be pre-populated for the user based on the physical topology information and ONI created, for example, in FIG. 4. Each node indicator 721 may include details about the corresponding node, including for example, the telecommunications identification number for the node (e.g., a COMMON LANGUAGE location identifier (CLLI) code), node number, the service cluster identification (SCID) and/or the fiber network identification (FNI). While the detailed node information within the node indicator may be illegible or difficult to read when the user is viewing a large section of nodes (as in FIG. 7A), a user may use a zoom control to view the detailed information.

Node indicators 721 may be assigned a function within the graphic layout 720 by a user. Input may be received in a variety of manners, including for example through use of an input device (such as, for example, a mouse or track pad) guiding cursor 725 both to select a node indicator 721 and to select a node function from a designator in toolbar area 730. Thus, the GUI may provide a "point-and-click" environment to easily assign functions to node indicators.

Toolbar area 730 may provide a variety of tool buttons for a user to designate node functions and other commands. As shown in FIG. 7A, toolbar area may include the following exemplary tool buttons: zoom in/out 731, west path designator 732, east path designator 733, node insert/delete tool 735, source A node designator 736, source B node designator, 737 and destination node designator 738. Each node indicator 721 in the pre-populated graphical layout 720 may be initially assigned a neutral color (e.g., gray). As user input is received, each node indicator 721 may be color-coded according to an assigned function (e.g., source A, source B, destination, etc.). Color coding may correspond to, for example, the color of the corresponding designator tool button. In the particular example of FIG. 7A, a west path 723 is shown starting from a node indicator 726 identified as source A, through multiple intermediate destination nodes 728, to a final destination node 729. Multiple other node indicators 721 along west path 723 may be selected by the user to connect the source nodes 726, 727 to the destination nodes 728, 729. Second area 750 may provide circuit details for any selected node indicator 721 shown in the graphical layout. The circuit details may also include an option for the user to input cross-connect functions (e.g., drop, add, etc.) for each degree of a selected node. (Each node in a mesh network may be characterized by its degree, the number of incoming or outgoing fibers that cross-connect in the node.) The list of available degrees for a selected node may be automatically provided based on the physical network topology.

In FIG. 7B, reference numbers elements identical to FIG. 7A have been removed to provide a more clear illustration of the exemplary graphical user interface. FIG. 7B shows a graphical layout of an east path for the same ONI used in FIG. 7A.

Figure 7C:
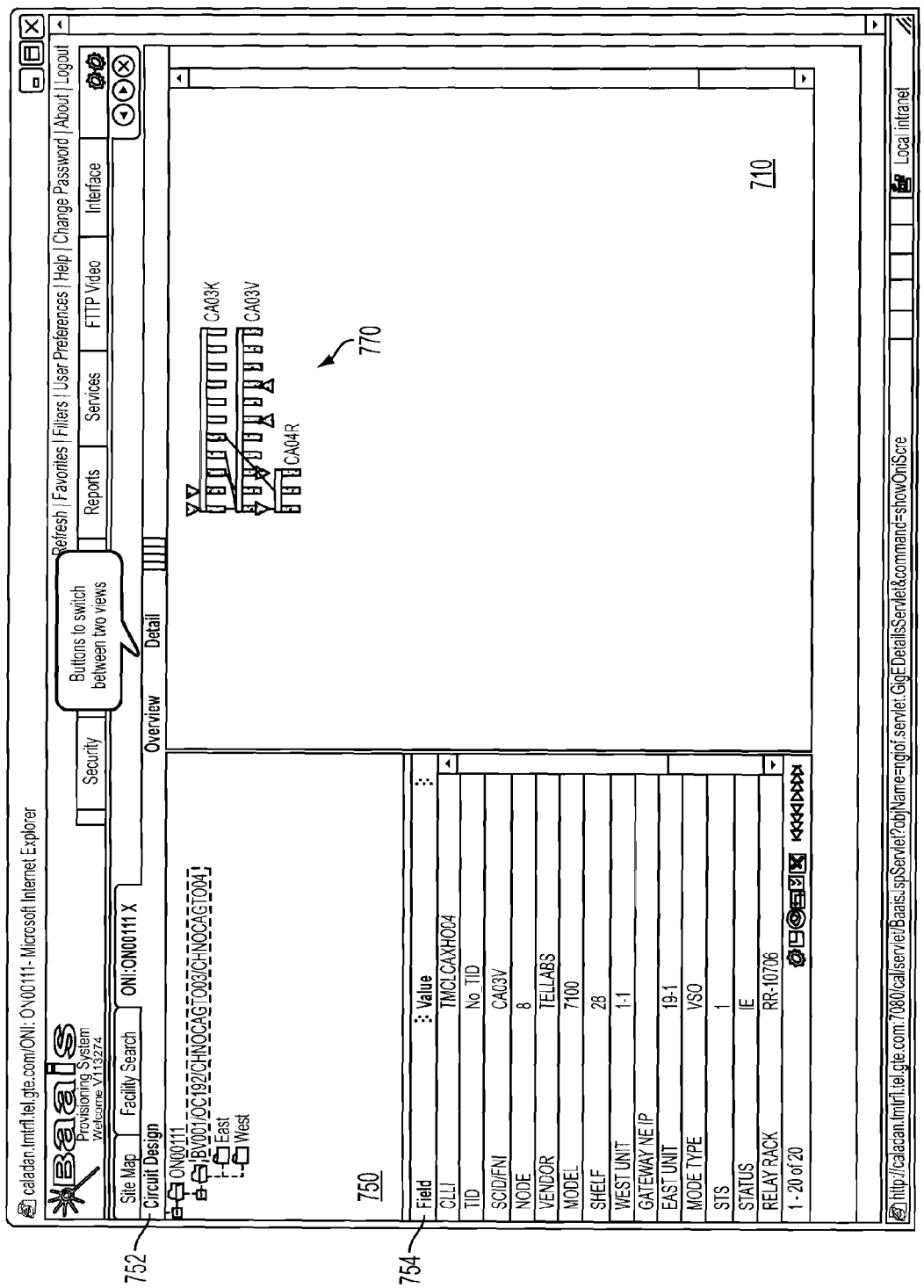
FIG. 7C provides a screen shot of another exemplary GUI for selecting paths for dense wavelength division multiplexing IDs (DWIDs) within an optical network identifier (ONI)

FIG. 7C provides exemplary screen shot of another GUI for selecting paths for several DWIDs within an ONI. The GUI in FIG. 7C may include a first area 710 and a second area 750. First area 710 may provide a graphical overview 770 of one or more portions of an ONI. A user may select a section from the overview for a more detailed representation, such as that shown in FIGS. 7A and 7B. Second area 750 may include circuit design section 752 to allow a user to identify a particular subset of a larger circuit design. Second area 750 may also include node detail section 754 that includes detailed information about a particular selection node indicator in graphical overview 770.

Returning to the process flow of FIG. 6, the user may be prompted for east paths on DWIDs (block 640). For example, similar to block 630 described above, the GUI provided by assignment and provisioning system 150 may allow the user to select separate east paths for all destination nodes from a source node. For each DWID, the user may select an east path from a source node to a destination node, with the source node in the first DWID being the VHO.

All VSOs in the selected east and west paths may be selected (block 650). For example, the GUI provided by assignment and provisioning system 150 may identify each of the VSO nodes in each east and west DWID path.

The degrees at IC nodes, VSO nodes and VHO nodes may be selected (block 660). For example, for each east and west path, the GUI of assignment and provisioning system 150 may prompt the user to select the degrees at the IC(s). The GUI may also prompt the user to select which degrees (if any) to drop to sub-rate multiplexing transponder modules (STMS) at the VSO nodes and the degrees (if any) to add a signal at the VHO nodes. The degrees of propagation for a node may be dependent upon the capabilities of the optical transport system components at that node. For example, some equipment may propagate signals in 8 directions. The GUI may allow the user to select endpoints of cross-connects for each DWID. The end-point of cross-connects, such as from a SMTM to a first RCMMA or from a first RCMMA to a second RCMMA, may be identified in the GUI on the source/hub nodes and destinations nodes.

Figure 8:
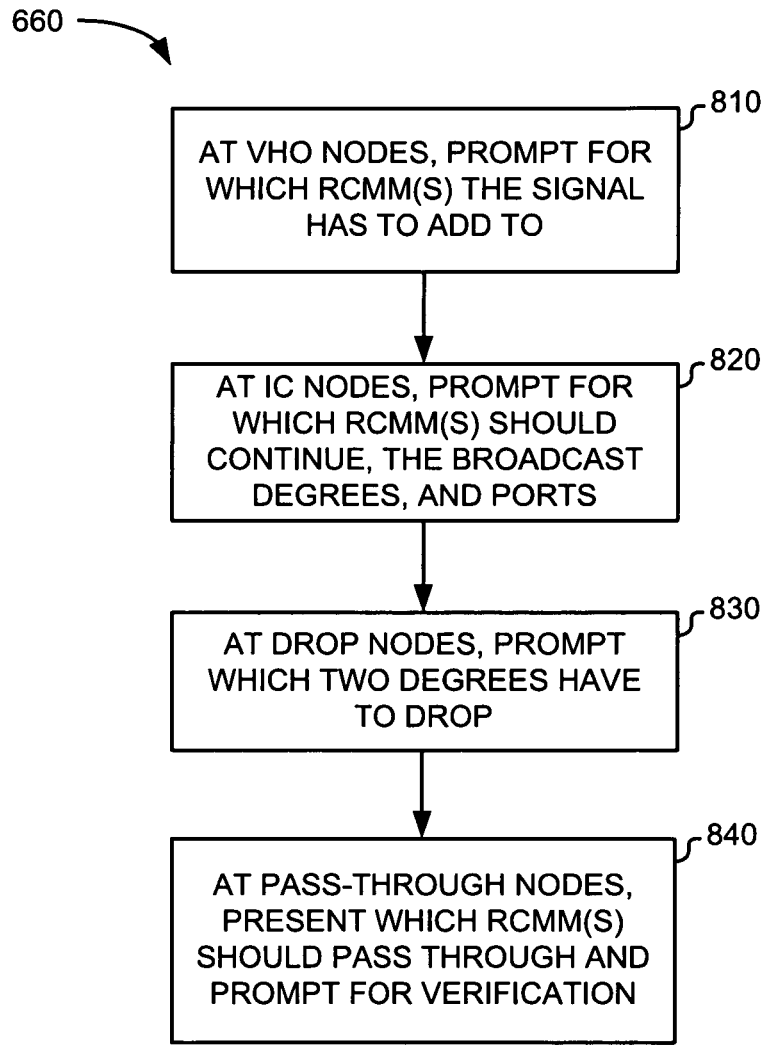
FIG. 8 is a flow chart illustrating exemplary operations for selecting degrees at interconnecting (IC) nodes, video serving office (VSO) nodes and video hub office (VHO) nodes.

FIG. 8 provides a flow chart illustrating exemplary operations for block 660, selecting the degrees at the IC nodes, the VSO nodes and the VHO nodes. At VHO nodes, the user may be prompted to select which RCMMs the signal has to add to (block 810). There may be two RCMM(s) or more RCMM(s) the signal has to add to. At IC nodes, the user may be prompted to select which RCMM(s) should continue, the broadcast degrees and ports (block 820). At drop nodes (e.g., VSO nodes where a signal is delivered), the user may be prompted to select which degrees (e.g., two degrees) have to be dropped (block 830). At pass-through nodes (e.g., VSO nodes where a signal not delivered), the user may be presented with which RCMM(s) should pass through and be prompted for verification (block 840).

Methods and systems described herein may allow a user to build a facility circuit on a particular wavelength using the wavelength selective switching (WSS) feature of Reconfigurable Optical Add/Drop Multiplexer (ROADM) devices. The methods and systems provide a GUI that allows the user to assign node functionality for multiple nodes in a pre-populated representation of a regional network.

The foregoing description provides illustration and description, but is not intended to be exhaustive or to limit the embodiments to the precise form disclosed. Modifications and variations are possible in light of the above teachings or may be acquired from practice of systems and methods disclosed herein.

Also, while series of blocks have been described with regard to the flowcharts of FIGS. 3-6 and 8, the order of the blocks may differ in other implementations. Further, non-dependent acts may be performed in parallel.

Implementations described herein may be implemented in methods and/or computer program products. Accordingly, implementations may be embodied in hardware and/or in software (including firmware, resident software, micro-code, etc.). Furthermore, implementations described herein may take the form of a computer program product on a computer-usable or computer-readable storage medium having computer-usable or computer-readable program code embodied in the medium for use by or in connection with an instruction execution system. The actual software code or specialized control hardware used to implement the systems and methods described herein is not limiting. Thus, the operation and behavior of the implementations were described without reference to the specific software code—it being understood that software and control hardware could be designed to achieve implementations based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    receiving, by a computing device, an order for services to be provided by an optical network, the order identifying bandwidth requirements for the optical network and multiple broadcast locations within a particular geographic region;
    retrieving, by the computing device and based on the order for services, information regarding optical transport system components for the particular geographic region;
    creating, by the computing device and based on the information regarding the optical transport system components for the particular geographic region, an optical network identifier, the optical network identifier identifying an aggregation of dense wavelength data multiplexers that defines one or more paths;
    prompting, by the computing device, a user to select a wavelength for a broadcast circuit through the dense wavelength data multiplexers using a graphical user interface, where the prompting includes providing the user with a list of available wavelength intervals from which to select a particular wavelength;
    prompting, by the computing device, the user to select one or more first paths for the broadcast circuit through the dense wavelength data multiplexers using the graphical user interface;
    prompting, by the computing device, the user to select one or more second paths for the broadcast circuit through the dense wavelength data multiplexers using the graphical user interface, where the one or more second paths are different than the one or more first paths;
    querying, by the computing device, an operations support service for available bandwidth to support bandwidth requirements over the selected wavelength, the selected one or more first paths, and the selected one or more second paths; and
    assigning, by the computing device, the selected wavelength, the selected one or more first paths, and the selected one or more second paths for the broadcast circuit based on the available bandwidth.

2. The method of claim 1, further comprising:
    requesting the operations support service to reserve bandwidth for the assigned circuit; and
    designing a circuit layout record based on the assigned circuit path and the reserved bandwidth.

3. The method of claim 1, further comprising:
    automatically sending the circuit layout record to a support office for implementation.

4. The method of claim 1, further comprising:
    sending a request to a network management server device to activate the broadcast circuit.

5. The method of claim 1, where the one or more first paths are one or more west paths from source nodes to destination nodes and the one or more second paths are one or more east paths from source nodes to destination nodes, the method further comprising:
    prompting the user to provide a deadline for completion of the broadcast circuit;
    automatically selecting servicing nodes in the one or more west paths and one or more east paths; and
    prompting the user to select degrees of propagation for each node in the one or more west paths and one or more east paths.

6. The method of claim 5, where the servicing nodes are video servicing offices (VSO), where the source nodes are video hub office (VHO) nodes, and where prompting the user to select the degrees of propagation for each node comprises:
    prompting the user to select, for each VHO, one or more of a plurality of reconfigurability class marketing modules (RCMM) to which the signal has to be added at each VHO;
    prompting the user to select, for each interconnecting node, at least one of the plurality of RCMMs to continue the degrees of propagation and associated ports; and prompting the user to select, for each VSO, either one of the degrees to drop or one of the plurality of RCMMs to pass through.

7. A system comprising:
a workflow management server device to request and receive scheduling information regarding at least one or more of equipment or human resources required to activate network services;
an inventory management server device to request and receive information regarding network component inventory and information regarding a physical topology of a network region;
a network management server device to initiate activation of the network services; and
a hardware processor to:
create an optical network identifier based on the information regarding the physical topology of a network region,
prompt a user, via a graphical user interface and based on information from the inventory management server device, to select a particular wavelength interval for a circuit,
prompt the user, via the graphical user interface and based on information from the inventory management server device, to select one or more first circuit paths for the circuit,
prompt the user, via the graphical user interface and based on the information from the inventory management server device, to select one or more second circuit paths for the circuit, where the one or more second circuit paths are different than the one or more first circuit paths,
design a circuit layout record based on the information from the workflow management server device, the inventory management server device, and the selected particular wavelength interval, the one or more first circuit paths, and the one or more second circuit paths, and
send a request to the network management server device to activate a broadcast circuit based on the circuit layout record.

8. The system of claim 7, where the hardware processor is further to:
send the circuit layout record to a support office for implementation.

9. The system of claim 7, where the one or more first circuit paths are one or more west circuit paths from source nodes to destination nodes and the one or more second circuit paths are one or more east circuit paths from source nodes to destination nodes and the hardware processor is further to:
prompt the user to provide a deadline for completion of the broadcast circuit;
automatically select servicing nodes in the one or more west circuit paths and one or more east circuit paths; and
prompt the user to select the degrees of propagation for each node in the one or more west circuit paths and one or more east circuit paths.

10. The system of claim 9, where the servicing nodes are video servicing offices (VSO) and the source nodes are video hub office (VHO) nodes, and where, when prompting the user to select the degrees of propagation for each node, the hardware processor is further to:
prompt the user to select, for each VHO, one or more reconfigurability class marketing modules (RCMMs) to which the signal is added at each VHO;
prompt the user to select, for each interconnecting node, at least one of the RCMMs to continue, the broadcast degrees of propagation, and associated ports; and
prompt the user to select, for each VSO, either one of the degrees of propagation to drop or one of the RCMMs to pass through.

11. A device comprising:
a hardware processor to:
receive information regarding optical transport system components for a particular geographic region;
create, based on the information regarding the optical transport system components for the particular geographic region, an optical network identifier, the optical network identifier identifying an aggregation of dense wavelength data multiplexers that define one or more paths;
generate a graphical user interface including:
a first screen area to provide a graphical layout of one or more portions of the optical network identifier, the graphical layout presenting node indicators and connecting paths associated with the optical network identifier, and
a second screen area to provide a graphical toolbar with node functions, where the second screen area is to allow a user to assign a node function, of the node functions, to at least one of the node indicators, where the graphical user interface enables the user to select the at least one of the node indicators from the graphical layout and the node function from the graphical toolbar;
prompt a user to select a wavelength for a broadcast circuit using the graphical user interface, where, when prompting the user, the hardware processor is to provide the user with a list of available wavelength intervals from which to select a particular wavelength interval;
prompt the user to select one or more first paths for the broadcast circuit through the dense wavelength data multiplexers using the graphical user interface;
prompt the user to select one or more second paths for the broadcast circuit through the dense wavelength data multiplexers using the graphical user interface, where the one or more second paths are different than the one or more first paths; and
assign the selected wavelength, the selected one or more first paths, and the selected one or more second paths for the broadcast circuit based on an available bandwidth.

12. The device of claim 11, where the graphical layout is pre-populated for the user based on physical topology information.

13. The device of claim 11, where each of the node indicators includes information about a corresponding one of the nodes within the graphical layout.

14. The device of claim 13, where the information includes at least one of a telecommunications identification number, a node number, a service cluster identification, or a fiber network identification.

15. The device of claim 11, where the graphical user interface further comprises a third screen area to provide the information about a particular node selected from the graphical layout.

16. The device of claim 11, where the node indicators are color-coded according to an assigned node function.

17. A non-transitory computer-readable medium containing instructions, the instructions comprising:

one or more instructions which, when executed by at least one hardware processor, cause the at least one hardware processor to retrieve a network topology for at least a portion of an optical network within a particular geographic region;

one or more instructions which, when executed by the at least one hardware processor, cause the at least one hardware processor to create on optical network identifier for a broadcast circuit based on the network topology for the particular geographic region;

one or more instructions which, when executed by the at least one hardware processor, cause the at least one hardware processor to present a graphical user interface of the optical network identifier, the graphical user interface identifying individual nodes and connections between the nodes;

one or more instructions which, when executed by the at least one hardware processor, cause the at least one hardware processor to prompt a user to select a wavelength for the broadcast circuit, using the graphical user interface, where the prompting includes providing the user with a list of available wavelength intervals from which to select a particular wavelength;

one or more instructions which, when executed by the at least one hardware processor, cause the at least one hardware processor to prompt the user to select one or more first paths for the broadcast circuit through the dense wavelength data multiplexers using the graphical user interface;

one or more instructions which, when executed by the at least one hardware processor, cause the at least one hardware processor to prompt the user to select one or more second paths for the broadcast circuit through the dense wavelength data multiplexers using the graphical user interface, where the one or more second paths are different than the one or more first paths;

one or more instructions which, when executed by the at least one hardware processor, cause the at least one hardware processor to accept user input, via the graphical user interface, to define functions for one or more nodes over the selected one or more first paths and the selected one or more second paths; and one or more instructions which, when executed by the at least one hardware processor, cause the at least one hardware processor to create a circuit layout record based on the optical network identifier, the selected wavelength, the selected one or more first paths, the selected one or more second paths, and the user input to define functions.

18. The non-transitory computer-readable medium of claim 17, further comprising:

one or more instructions which, when executed by the at least one hardware processor, cause the at least one hardware processor to query an operations support service for available bandwidth to support bandwidth requirements over the selected one or more first paths and the selected one or more second paths.

19. The non-transitory computer-readable medium of claim 17, where the one or more first paths are one or more west paths and the one or more second paths are one or more east paths.

20. The non-transitory computer-readable medium of claim 19, further comprising:

one or more instructions which, when executed by the at least one hardware processor, cause the at least one hardware processor to prompt the user to provide a deadline for completion of the broadcast circuit;

one or more instructions which, when executed by the at least one hardware processor, cause the at least one hardware processor to automatically select servicing nodes in the one or more west paths and one or more east paths; and one or more instructions which, when executed by the at least one hardware processor, cause the at least one hardware processor to prompt the user to select degrees of propagation for each node in the one or more west paths and one or more east paths.

\* \* \* \* \*